United States Patent [19]

Messinger

[11] 4,134,573
[45] Jan. 16, 1979

[54] FLUID FLOW STOP VALVE

[76] Inventor: Roderick G. Messinger, 450 N. Rossmore, Los Angeles, Calif. 90004

[21] Appl. No.: 796,162

[22] Filed: May 12, 1977

[51] Int. Cl.² ............................................. F16K 3/24
[52] U.S. Cl. ............................ 251/324; 251/DIG. 1
[58] Field of Search .................. 251/324, 319, DIG. 1

[56] References Cited

U.S. PATENT DOCUMENTS

| 2,893,334 | 7/1959 | Snyder | 251/324 X |
| 3,231,236 | 1/1966 | Hodel et al. | 251/324 |

FOREIGN PATENT DOCUMENTS

| 2309892 | 8/1974 | Fed. Rep. of Germany | 251/324 |
| 1284652 | 8/1972 | United Kingdom | 251/319 |

Primary Examiner—Arnold Rosenthal
Attorney, Agent, or Firm—Lyon & Lyon

[57] ABSTRACT

Disclosed herein is a stop valve particularly adapted for use with faucets, shower heads and the like for periodically stopping a flow of water therethrough and alleviating water waste. The stop valve is comprised of a body portion having a fluid inlet and a fluid outlet and a valve plug member slidably mounted therebetween for selectively sealing said outlet from said inlet and preventing fluid flow through said body member.

1 Claim, 3 Drawing Figures

FLUID FLOW STOP VALVE

BACKGROUND OF THE INVENTION

The present invention relates to a stop valve which is particularly adapted for use on faucets or shower heads for temporarily cutting off the flow of water therethrough. In the last couple of years, the western portion of the country has been suffering from severe drought conditions and, accordingly, considerable work has been done in the field of water conservation. However, two of the most open and notorious areas of water waste which have received little or no attention are found in the use of home faucets, particularly bathroom faucets and showers. Typically, when using the bathroom faucet for shaving or washing, the water is first brought up to a comfortable temperature and allowed to continually run throughout the entire shaving or washing operation thereby resulting in a considerable amount of water waste. People are very reluctant to periodically shut off the water flow after rinsing their razor or wetting their face for fear of a drop in water temperature when the water is again turned on. Accordingly, all efforts to change people's washing habits in an effort to conserve water have proved unsuccessful.

The use of showers presents a quite similar problem to that of the bathroom faucet in that people are unwilling to use the shower solely for wetting and rinsing purposes due to the difficulty in maintaining a comfortable water temperature. While some shower control devices are so constructed that the temperature can be maintained, the majority of older showers have separate hot and cold controls making this form of home water conservation a less than pleasing experience. It would therefore be highly desirable to provide a stop valve which can be easily installed on existing faucets and showers for periodically cutting off the water flow therethrough without appreciably affecting water temperature. With such a device installed, the water flow through faucets and showers could comfortably be limited to wetting and rinsing and thereby eliminate the tremendous water waste which otherwise results from the conventional continuous water flow whenever faucets or showers are in use.

SUMMARY OF THE INVENTION

Briefly, the invention relates to a push button stop valve for use on faucets or with shower heads for periodically cutting off the water flow therethrough during use so that the periodic flow can be used for wetting and rinsing and the water loss which would otherwise result from continuous flow during use is greatly reduced.

It is therefore the principal object of the present invention to provide a stop valve for use on faucets or with shower heads for periodically cutting off the water flow therethrough without appreciably affecting the temperature of the water.

It is another object of the present invention to provide a stop valve for use on faucets or with shower heads for periodically cutting off the water flow therethrough which is readily adapted for use with existing faucets and shower heads.

These and other objects and advantages of the present invention will become apparent from the following detailed description taken in conjunction with the accompanying drawings.

IN THE DRAWINGS

DESCRIPTION OF THE PREFERRED EMBODIMENT

Figure 1:
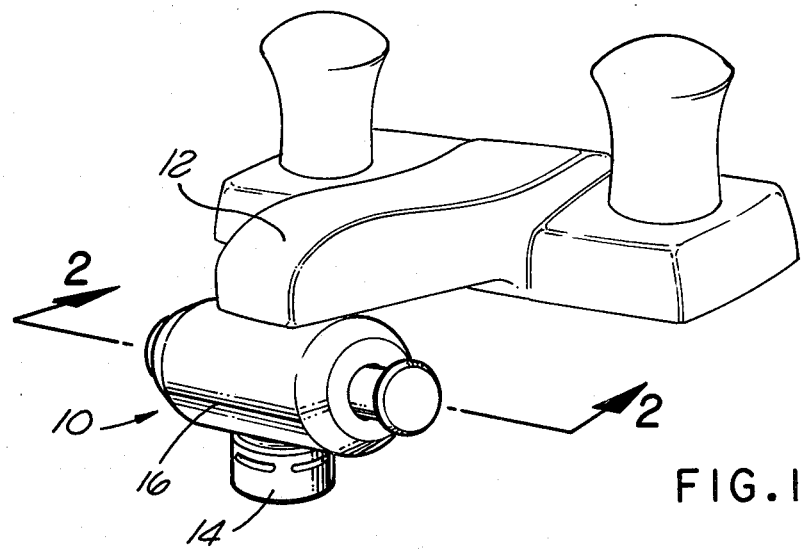
FIG. 1 is a perspective view of the stop valve secured to a faucet.

Referring now in detail to the drawings, the stop valve 10 of the present invention is illustrated in FIG. 1 in threaded engagement with the spout of a faucet 12 and has a conventional aerator 14 secured to the outlet end thereof. The stop valve 10 is comprised of a body portion 16 defining an enlarged water outlet opening 18 which terminates in an interior chamber 20 and is provided with internal threads 22 for threaded engagement with aerator 14. The body portion also defines an enlarged water inlet opening 24 which terminates in an interior chamber 26 and is provided with external threads 28 for threaded engagement with the spout of faucet 12. A cylindrical channel 30 extends transversely across the body portion 16 of the valve 10 between interior chambers 20 and 26 and communicates with said chambers by means of passageways 32 and 34, respectively. Passageways 32 and 34 are disposed adjacent opposite ends of interior chambers 20 and 26, as illustrated in FIGS. 2 and 3, for reasons which will become readily apparent.

A cylindrical valve plug 36 is slidably mounted within the correspondingly shaped channel 30 for selective interruption of fluid flow between the water inlet opening 24 and outlet opening 18 of the stop valve 10. The valve plug 36 is comprised of an enlarged head portion 38 at one end thereof, a first portion 40 of somewhat reduced diameter which is inwardly spaced from the head portion 38, a second portion 42 of reduced diameter which is inwardly spaced from the first portion 40, a third portion 44 of extended reduced diameter and a fourth portion 46 of somewhat reduced diameter. To allow the valve plug 36 to be inserted into the channel 30, one end 48 thereof is provided with a threaded fastening member 50 having an enlarged head portion 52 which is threadably engaged therewith and can be easily removed for insertion of the valve plug into channel 30. "O" rings 54, 56 and 58 are provided about those portions of the valve plug of reduced diameter, 40, 42 and 46, respectively. It should be noted that portion 42 is of a smaller diameter than portions 40 and 46 to accommodate a larger "O" ring 56. It has been found that such a configuration is preferred in that during the operation of the stop valve, "O" ring 56 is moved across the inner edges of chamber 20 resulting in wear on "O" ring 56 and the larger "O" ring is better able to withstand such wear. The extended portion 44 of reduced diameter is bordered by angularly disposed annular walls 60 and 62.

Figure 2:
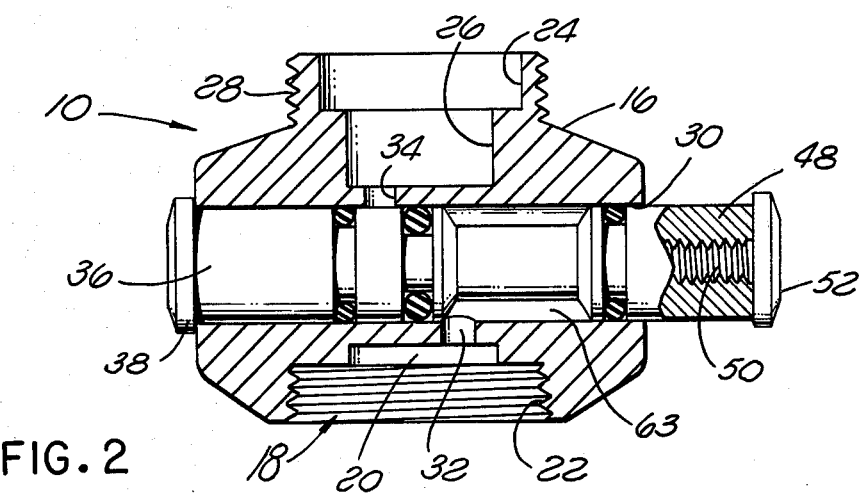
FIG. 2 is a partial sectional view of the stop valve in the open position.

The stop valve 10 is illustrated in the open position in FIG. 2. In use, water passes from the faucet spout (or shower pipe when used in a shower installation) to the inlet opening 18 of the valve body, from where it passes through interior chamber 20, passageway 32 and into a central valve chamber 63 defined by the area about portion 44 of the valve plug 36. The water then passes from chamber 63 through passageway 34 into interior chamber 26 and exits the valve through the outlet opening 24.

Figure 3:
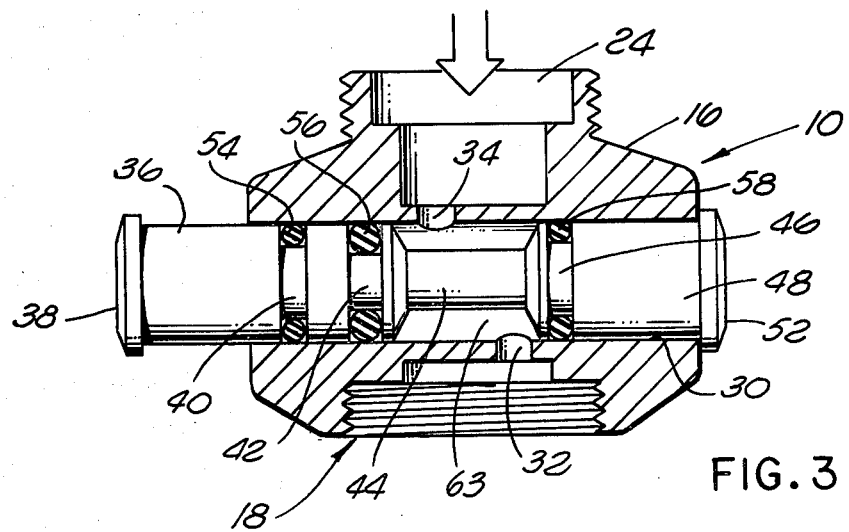
FIG. 3 is a partial sectional view of the stop valve in the closed position.

To close the stop valve, one only has to move the valve plug 36 to the position illustrated in FIG. 3, which is easily accomplished by the push button configuration of the valve plug. As the valve plug 36 moves to the closed position illustrated in FIG. 3, "O" ring 56 moves inwardly past passageway 32 thereby sealing the inward end of the channel and preventing any flow into chamber 63 and consequently preventing any flow to the outlet opening 24 of the stop valve. To resume fluid flow through the valve, it is only necessary to urge the valve plug 36 back to the open position illustrated in FIG. 2. Through such periodic regulation of the valve plug 36, the stop valve 10 can be correspondingly opened and closed to control the water flow therethrough without any appreciable variation in the temperature of the water which would customarily be preset to a comfortable level with the valve in the open position.

Various changes and modifications may be made in carrying out the present invention without departing from the spirit and scope thereof. Insofar as these changes and modifications are within the purview of the appended claims, they are to be considered as part of the present invention.

I claim:
1. A stop valve for use with a faucet or shower head, said valve comprising a body member having a fluid inlet, means adjacent said inlet for securing said body member to said faucet or shower head, a fluid outlet, a constant radius cylindrical fluid chamber extending transversely through said body member, a first passageway communicating said valve chamber with said fluid inlet, a second passageway communicating said valve chamber with said fluid outlet, a cylindrical valve member slidably mounted within said chamber and having an intermediary portion of reduced cross-sectional diameter, a pair of sealing members carried by said valve member externally adjacent each end of said intermediary portion of said valve member such that upon urging said valve member to a first position, said first passageway communicates with said second passageway about said intermediary portion of said valve member and upon urging said valve member to a second position, one of said sealing members seals said fluid outlet from said valve inlet preventing fluid flow through said stop valve, and a third sealing member carried by said valve member and spaced outwardly from said one sealing member, said one sealing member having a larger cross-sectional diameter than the remaining two sealing members.

* * * * *